Aug. 16, 1960 — W. KOWALCZYK — 2,948,981
FISHING AID
Filed Nov. 7, 1957
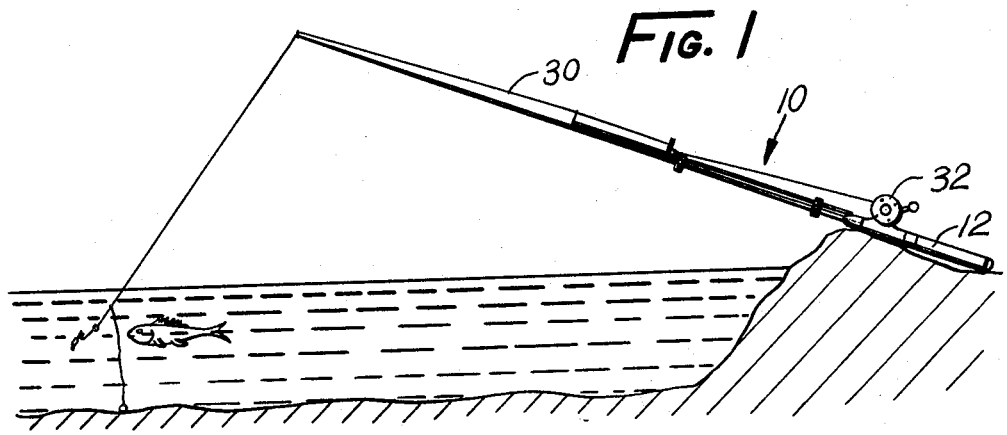
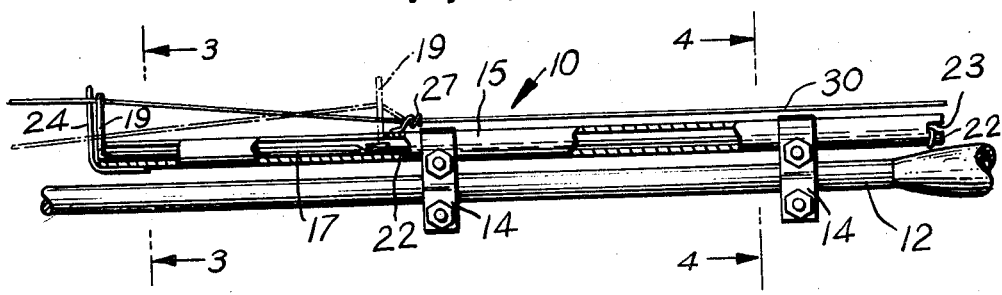
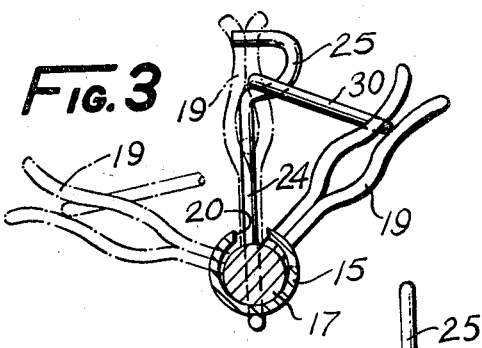
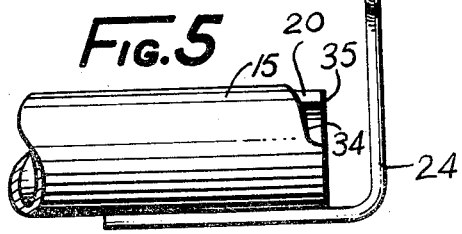
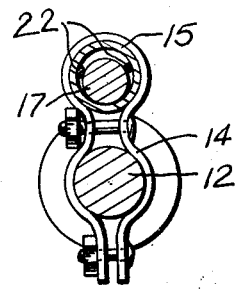
INVENTOR.
*Walter Kowalczyk*

United States Patent Office 2,948,981
Patented Aug. 16, 1960

2,948,981
FISHING AID

Walter Kowalczyk, Wyandotte, Mich., assignor to Gadget-Of-The-Month Club, Inc., North Hollywood, Calif., a corporation of California Filed Nov. 7, 1957, Ser. No. 694,949

1 Claim. (Cl. 43—16)

This invention relates to fishing apparatus and more particularly to an attachment for fishing poles.

It is an object of the present invention to provide a pull sensitive device for attachment to fishing poles which will automatically give a signal when a fish bites upon the hook, whereby the fishing pole need not be constantly held by the fisherman or the action of the line constantly observed.

Another object of the present invention is to provide an attachment of the above type which will automatically jerk the line in response to a fish biting upon the hook so as to both give the aforementioned signal and to more firmly hook the fish.

Other objects of the invention are to provide a fishing air bearing the above objects in mind which is of simple construction, has a minimum number of parts, is inexpensive to manufacture and efficient in operation.

For other objects and for a better understanding of the invention, reference may be had to the following detailed description taken in conjunction with the accompanying drawing, in which:

Figure 1 is a side elevational view of a fishing aid made in accordance with the present invention in operative use with fishing apparatus;

Figure 2 is an enlarged side elevational view with parts broken away, of the fishing rod attachment;

Figure 3 is an enlarged transverse cross sectional view taken along line 3—3 of Figure 2;

Figure 4 is an enlarged transverse cross sectional view taken along line 4—4 of Figure 2; and Figure 5 is an enlarged side elevational view of certain parts of the device shown in Figure 2.

Referring now more in detail to the drawing, an attachment 10 made in accordance with the present invention is shown in operative association with a fishing pole 12, secured thereto by means of clamps 14. This device includes a main tubular member 15 that is supported in spaced parallel relationship with the longitudinal axis of the pole 12. A plunger 17 is slidably supported within the bore of the tubular member 15 and has a perpendicularly related integral clamp member 19 slidably disposed within a longitudinal slot 20 in the forward end of the tube. This plunger and clamp member is normally urged toward a retracted position by means of an elastic band 22 extending between the inner end of the plunger 17 and the detent 23 at the rearward end of the tubular member 15. A guide arm 24 is secured to the forward end of the tubular member 15 for guiding the line 30 for actuating the plunger in a manner hereinafter described. A loop 27 through which the line 30 is also threaded is secured to the mid section of the tubular member 15 rearwardly of the end of the longitudinal slot 20.

As is more clearly shown in Figure 5 of the drawing, the forward end of the tubular member 15 is provided with a slightly curved edge 34 and a straight edge 35 which communicate with the slot defining portions of the member. In actual use, the fishing line 30 is fed from the reel 32 toward the outer end of the rod 12 in a conventional manner. After the line has been cast and it is desired to use the attachment, it is only necessary to guide the line 30 around the hook 25 of the guide arm 24 and into clamping engagement with the releasable clamp 19 that is integral with the forward end of the plunger 17. The plunger is then pulled forwardly against the action of the elastic member 22 and rotated out of the slot 20 into engagement with either the arcuate end edge 34 or the straight end edge 35, depending upon the degree of sensitivity desired. With the line extending rearwardly through the other guide loop 27, it will be recognized that a slight pull upon the line 30 will cause rotation of the clamp 19 and plunger 17 about the longitudinal axis of the tube 15 so that the plunger 17 will be retracted by the action of the elastic band thereto. Of course, a much lighter pull upon the line will cause rotation of the clamp 19 along the arcuate edge 34 than would be required to move the clamp 19 along the straight edge 35. Thus, two settings have been provided; the use of the edge 34 being adapted for more sensitive types of fish and the straight edge 35 being provided for less sensitive results. The rearward movement of the plunger will also be audible so as to signal the fisherman that there is a bite on the hook, following which the rod and reel may be picked up and the fish reeled in. Since the engagement of the line 30 with the clamp 19 is merely a sliding friction type of engagement, it will not interfere with the reeling in of the line or unduly wear the line so as to weaken it. It will now also be recognized that the guide members 24, 27 are instrumental in pulling the clamping member 19 into alignment with the slot 20 of the tube during use so as to provide the desired results.

While various changes may be made in the detail construction, it shall be understood that such changes shall be within the spirit and scope of the present invention as defined by the appended claim.

What I claim as new and desire to protect by Letters Patent of the United States is:

A fishing pole comprising, in combination, an elongated rod, a handle and reel carried at one end of said rod, a flexible fishing line connected to said reel and extending along substantially the entire length of said rod, tension sensitive means carried on said rod intermediate the ends of said rod, said tension sensitive means comprising a tube having a longitudinal slot spaced above and extending substantially parallel to said rod, a loop at the rearward extremity of said slot, a releasable friction clamp extending substantially perpendicular to said tube adapted for engaging said line and being slidably supported for longitudinal movement within said slot, elastic means acting between said clamp and said tube urging said clamp toward said one end of said rod, the opposite forward transverse end of said tube defining a pair of bearing surfaces, one on each side of the open end of said slot selectively and slidably maintaining said clamp in an angularly rotated adjusted position about the longitudinal axis of said tube and out of communication with said slot, one of said surfaces being substantially perpendicular to said slot and the other surface having a slightly curved edge, a guide arm mounted on the said opposite end of said tube extending outwardly past the surfaces sufficiently to allow movement of said clamp between the arm and said surfaces and being substantially perpendicular to the longitudinal axis of said tube and in alinement with said slot, said line extending from the reel, passing through said loop and connected to said clamp and continuing outwardly on the side of the arm opposite to said clamp in order for an outward pull on the line to effect rotation of said clamp into communication with said slot for inward movement by said elastic means thereby jerking said line.

References Cited in the file of this patent
UNITED STATES PATENTS

| | | |
|---|---|---|
| 2,316,256 | Kohn | Apr. 13, 1943 |
| 2,552,516 | Camp et al. | May 15, 1951 |
| 2,659,174 | Leach | Nov. 17, 1953 |
| 2,746,197 | Rogers | May 22, 1956 |
| 2,801,487 | Morgan | Aug. 6, 1957 |
| 2,850,831 | Setterdahl | Sept. 9, 1958 |